(No Model.)
J. D. PERRY.
POTATO DIGGER.
No. 383,488. Patented May 29, 1888.
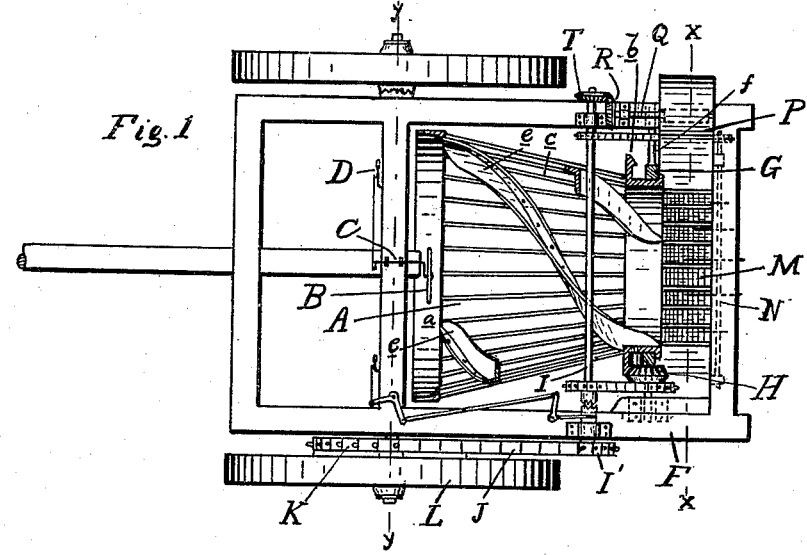
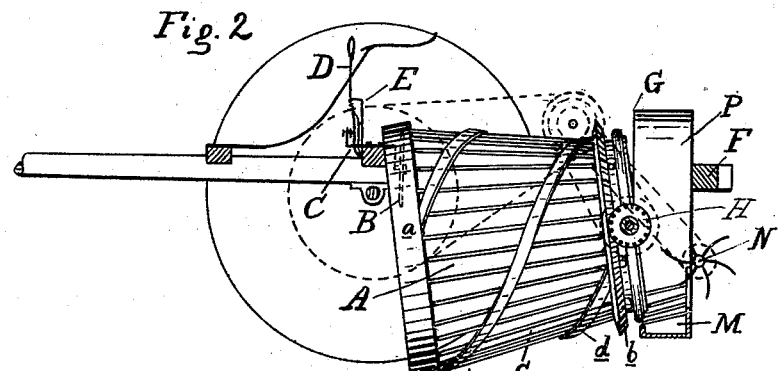
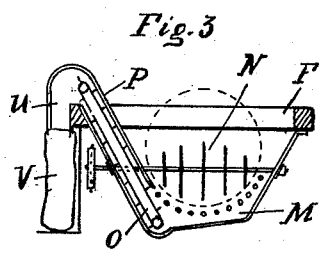
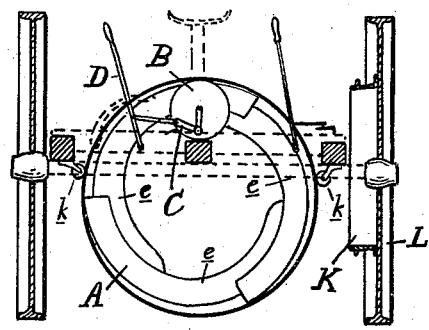
Witnesses:
P. M. Hulbert
Jos. Whittemore
Inventor:
Judson D. Perry,
By Thos. L. Sprague & Son
Att'y.

UNITED STATES PATENT OFFICE.

JUDSON D. PERRY, OF DETROIT, MICHIGAN.

POTATO-DIGGER.

SPECIFICATION forming part of Letters Patent No. 383,488, dated May 29, 1888.

Application filed September 16, 1887. Serial No. 249,859. (No model.)

*To all whom it may concern:*

Be it known that I, JUDSON D. PERRY, a citizen of the United States, residing at Detroit, in the county of Wayne and State of Michigan, have invented certain new and useful Improvements in Potato Diggers, of which the following is a specification, reference being had therein to the accompanying drawings.

This invention relates to new and useful improvements in potato digging machines; and the invention consists in the different construction and arrangement of the parts, as more fully hereinafter described.

In the drawings which accompany the specification, Figure 1 is a plan view of my device, partly in section. Fig. 2 is a side elevation, also partly in section. Fig. 3 is a cross-section on line $xx$ in Fig. 1. Fig. 4 is a cross-section on line $yy$ in Fig. 1. Fig. 5 is a detached view of the circular bearing of the revolving scoop.

A is a revolving scoop, provided at its forward end with the circular cutting-blade $a$ and at its rear end with the bevel gear-wheel $b$, and intermediate with the grating $c$, constructed in any suitable manner, but united with the cutting-blade and the gear-wheel $b$ in such manner as to form a rigid structure, substantially of the shape shown; and to strengthen the parts still more I preferably provide it on the outside, between the respective ends, with the spiral braces $d$, which at the same time preferably form means for securing the inwardly-projecting spiral wings $e$, which are preferably made to extend to the rear end, as shown, and the object of which is to carry the potato-hills scooped up at the forward end through the scoop, and separate in the revolutions of the scoop the potatoes from the soil, as hereinafter described.

The front end of the scoop is supported at its top upon a disk, B, which is journaled upon the end of the crank-shaft C, suitably operated by the lever D, which is placed within proximity of the driver's seat and engages with the notched quadrant E, by means of which the disk B may be raised and lowered to adjust the scoop in and out of the ground.

The rear end of the scoop is pivotally secured upon the frame F by means of the circular bearing G, which is provided with trunnions $f$, which are journaled to the frame F. Upon one of these trunnions is sleeved the pinion H, which meshes with the cogs of the gear-wheel $b$. Upon the outer end of a shaft, I, journaled transversely the frame, is secured the sprocket-wheel I', which receives motion by means of the link-belt J over the sprocket-wheel K, secured upon one of the two drive-wheels L, upon which the frame F is mounted in the usual manner, to support the operating parts. From the shaft I motion is carried to the operating parts in any suitable manner.

Upon the rear end of the scoop, and supported by the frame, is constructed the laterally-extending trough M, which is covered over at the discharge end of the scoop with a suitable grating to permit the potatoes discharged from the scoop to drop into the trough, but retain the potato-vines, which are intended to pass over that trough to the ground; and to facilitate such discharge of the vines I preferably adjust a revolving reel, N, above such trough, and which is preferably provided with a series of cutting-blades adapted to throw off the vines and cut them up, if too bulky to be moved readily. The bottom of the trough M has a suitable incline toward one end, as shown, to carry the potatoes to the elevator O, which is arranged in a suitable trunk, P, and receives motion in any suitable manner, preferably, as shown, by means of a shaft, Q, which runs forwardly, and is provided with a pinion, R, which meshes with the bevel gear-wheel T upon the shaft I.

The trunk P has a suitable discharge-spout, U, of sufficient height above the ground to permit of the adjustment of bags underneath to receive the potatoes.

It will be seen that the machine is extremely simple, and that in its construction it presents several novel features.

First. It will be noticed that the mouth of the scoop is perfectly open all through its interior, giving free and unobstructed entrance to potato-vines or weeds encountered, and giving the same free discharge, whereby all the annoyance caused in other machines from the clogging of such vines and weeds is entirely avoided.

Second. The capacity of the machine is equal to handling the most phenomenal crop, and by means of the wings and the grating, which are in constant motion, a very quick separation of the soil from the potatoes is effected, so that the machine affords a great saving of power by freeing itself readily of the weight of the soil, which is always a serious factor to deal with.

Third. The circular cutter-blade requires a minimum of force on account of its shearing scoop action to pull it through the ground, and if any lateral pressure from its scoop action should arise it may be easily counteracted by placing little disks or rollers $k$ near the front end of the scoop. Anti-friction rollers may be placed likewise between the bearing-faces of the wheel $b$ and the circular bearing G.

Fourth. The scoop is easily adjusted in and out of the ground and to any depth desired to cut.

Fifth. The machine in operation is well balanced.

What I claim as my invention is—

1. In a potato-digging machine, the combination, with the revolving scoop A, of the rolling disk B, supporting the forward end thereof, the crank-shaft and operating-lever for adjusting said disk vertically, and the ring-bearing G at the rear end of the scoop, said ring-bearing being supported on trunnions of the frame, substantially as described.

2. In a potato-digging machine, the combination, with a revolving scoop, of a bevel gear-wheel secured upon the rear end thereof, a ring-bearing in which said gear-wheel is journaled, trunnions on said bearing, and by which it is mounted in the frame, and a drive-pinion upon one of said trunnions and meshing with said gear-wheel, all substantially as described.

3. The combination, with the revolving scoop and the frame, of the crank-shaft C, provided with lever D, and the disk B on said crank-shaft, within said scoop and supporting the front end thereof, substantially as described.

4. The combination, with the revolving scoop and the frame, of the crank-shaft C, provided with lever D, and the disk B on said crank-shaft, within said scoop and supporting the front end thereof, and the rollers $k$ on the frame, near the front end of the scoop, substantially as described.

5. In a potato-digging machine, the combination of the revolving scoop A, the circular trough M, provided with a grating on top, the elevator-trunk P, the elevator O, the discharge-spout U, and the revolving vine-cutter N, within said trough below the grating, all arranged to operate substantially as described.

6. In a potato-digging machine, a revolving scoop consisting of the cutting-blade $a$, the tapered grating $c$, the gear-wheel B, the spiral braces $d$, secured to said grating, and the spiral wings $e$, secured to said braces, all substantially as described.

In testimony whereof I affix my signature, in presence of two witnesses, this 27th day of August, 1887.

JUDSON D. PERRY.

Witnesses:
JAS. WHITTEMORE,
THOMAS E. ROBERTSON.